(12) United States Patent
Chu

(10) Patent No.: US 7,143,861 B2
(45) Date of Patent: Dec. 5, 2006

(54) FRONT SUSPENDING AND STABILIZING STRUCTURE FOR REMOTE CONTROL CAR

(76) Inventor: Daimler Chu, No. 32, Lane 112, Si Yuan Rd., Hsinchuang City (TW)

( * ) Notice: Subject to any disclaimer, the term of this patent is extended or adjusted under 35 U.S.C. 154(b) by 376 days.

(21) Appl. No.: 10/759,064

(22) Filed: Jan. 20, 2004

(65) Prior Publication Data
US 2005/0156399 A1 Jul. 21, 2005

(51) Int. Cl.
*B60K 17/00* (2006.01)
(52) U.S. Cl. .................. 180/346; 180/377; 180/378; 280/124.109; 280/124.134
(58) Field of Classification Search ......... 280/124.134, 280/124.135, 124.136, 124.15, 124.138, 280/124.139, 124.109; 180/346, 377, 378
See application file for complete search history.

(56) References Cited

U.S. PATENT DOCUMENTS 2,942,678 A * 6/1960 Uhlenhaut et al. .......... 180/360
5,833,026 A * 11/1998 Zetterstrom et al. ........ 180/360
6,915,873 B1 * 7/2005 Woods et al. ............... 180/361

* cited by examiner

*Primary Examiner*—Eric Culbreth
(74) *Attorney, Agent, or Firm*—Leong C. Lei

(57) ABSTRACT

An improved suspending and stabilizing structure for a remote control car at least comprises a primary frame and two supporting arms moveably connected to two sides of the primary frame. The primary frame is provided with a holder on the bottom which can be provided with a cover at the front end. Besides, transmission shafts are connected to the primary frame for the installation of wheels. Corresponding holding holes and through holes are provided on the holder and the cover, respectively, while one end of the supporting arms may provided with a recession, on two sides of which are provided with corresponding holes. Threaded holes are provided at the outer sides of the holding holes and through holes, such that a front differential can be fastened thereto by way of screws, thereby the supporting arms can be lengthened to the greatest extent and that when the wheels run on rough roads, the oscillation range of the supporting arms can be reduced, thus enhancing the stability of the traveling vehicle.

4 Claims, 7 Drawing Sheets

FRONT SUSPENDING AND STABILIZING STRUCTURE FOR REMOTE CONTROL CAR

BACKGROUND OF THE INVENTION (a) Technical Field of the Invention

The present invention relates to an improved suspending and stabilizing structure for a remote control car, particularly to one in which the supporting arms can be lengthened to the greatest extent, such tat when the wheels run on rough roads, the oscillating range of the supporting arms can be reduced, and the gravity center of the vehicle can be lowered, thus enhancing the stability of the traveling vehicle.

(b) Description of the Prior Art

Generally, the front shock absorbing structure of the front differential of the conventional remote control car, as shown in FIG. 5, comprises a front differential 4 which is provided with a holding board 41 at the front end. The holding board 41 is fastened to the front end of the differential 4 by way of two screws 42 and pivotally connected to a supporting arm 43 at each outer side of the fastening screws 42. However, the pivotal connecting positions of the supporting arms 43 of the prior art are utilized to set on the most outer side of the front different 4, in order to obtain a shock absorbing effect at the time when the wheels of the vehicle are running on rough roads.

According to the technology applied in the prior art, while the supporting arms 43 are pivotally connected to the two sides of the differential 4, the assembly of the supporting arms 43 would be slightly later than that of the front differential 4. Therefore, in the current remote control vehicle structures, the axle center 44 of the pivotal connection position A of the supporting arms 43 is disposed on the outer side of the fastening points of the screws 42.

When the above-mentioned shock absorbing structure is applied to the wheels of a vehicle for running on rough roads, the shock absorbing effect can be obtained. However, in view of the fact that the supporting arms 43 are provided on the outer side of the two screws 42 on the front differential 4, and that there is a limitation of the size of a remote control car under the proportion of the 1:8 or 1:10 to the real car, the decision of the position of the axle center 44 of the supporting arms 43 would involve the possibility of the greatest length of the supporting arms.

Referring to FIG. 6, hereunder are descriptions relating to how the length of the supporting arms in the suspending system would influence the stability of a running car. Under the circumstances that the supporting arm 43a is designed in a smaller size, when the car is running on a rough road, the distance between the axle center 44 of the supporting arm 43a and the outer end would be rather short, rendering the supporting arm 43a bearing a greater oscillating angle $\theta 1$ and the front differential bearing a greater dash force. On the contrary, when the distance between the axle center 45 of the supporting arm 43b and the outer end is longer, when the height of the obstacle 50 remains the same, the pivotal connecting point 45 of the axle center 45 would have an oscillating angle $\theta 2$ which is apparently smaller than the angle $\theta 1$. Currently, the toy remote control cars are manufactured in a size under the proportion of the 1:8 and 1:10 to the real car, and the manufacturers of conventional remote control cars desire to extend the length of the supporting arms 43 (or 43a) to a greatest range, such that when the wheels are dashed, the front differential would have a smallest oscillating range.

As shown in FIGS. 7a and 7b, under the circumstances that the width of the vehicle body remains unchanged, when the supporting arms 43 of the shock absorber are provided as long as possible, the vehicle body would have a more stability during traveling. As shown, in case point A is the fastening point of the supporting arms of a prior art (as shown in FIG. 7a), and point B is the fastening point of the supporting arms of the present invention (as shown in FIG. 7b, under the same output horsepower P, the respective lifting angles of the chassis of the vehicle in speeding are: $\theta 3$ for point A and $\theta 4$ for point B. As length b is longer than length a, angle $\theta 4$ is smaller than angle $\theta 3$. Apparently, when the length of the supporting arm increases, the height that the chassis lifts during traveling would become less, such that the gravity center of the vehicle body would be lower and stabler and that stability can be obtained when the vehicle is turning under high speed, avoiding the vehicle from turning over.

SUMMARY OF THE INVENTION

The primary object of the invention is to provide an improved suspending and stabilizing structure for a remote control car. Under the circumstances that the width of the vehicle body is fixed, the supporting arms can be lengthened to the greatest extent, such that when the wheels run on rough roads, the oscillation range of the supporting arms can be reduced, thereby making the oscillating range of the front differential smaller and reducing the dashing force borne by the vehicle body.

The secondary object of the invention is to provide an improved suspending and stabilizing structure for a remote control car. Under the circumstances that the vehicle body is fixed at a pre-determined width, the supporting arms can be lengthened to the greatest extent, such that when the remote control car is speeding, the gravity center thereof can be lowered and the vehicle body would not easily turn over under high speed, thereby enhancing the stability of the traveling vehicle.

To obtain the above objects, the suspending and stabilizing structure for a remote control car according to the present invention is composed of a primary frame and two supporting arms. While the primary frame is provided with a holder on the bottom, the supporting arms are moveably connected to the two sides of the primary frame which is moveably connected with transmission shafts and driving arms for installation of wheels. Besides, the holder on the bottom of the primary frame is provided with holding holes at two ends. A recession is provided at one end of each supporting arm; thereby the supporting arm can be mounted on the holder of the primary frame. Besides, a hole corresponding to the holding hole is provided on each sidewall of the recessions, such that a fastening pillar can be inserted into the holding hole and its corresponding hole. Threaded holes are provided at the outer side of the holding holes on the primary frame for fastening the front differential by screws. Accordingly, the supporting arms can be lengthened; thereby when the wheels are running on rough roads, the oscillation range of the supporting arms can be reduced, thus enhancing the shock absorbing effect of the traveling vehicle.

The novelty and many other advantages of the invention will become more readily appreciated as the same becomes better understood by reference to the following detailed description, when taken in conjunction with the accompanying drawings.

DETAILED DESCRIPTION OF THE PREFERRED EMBODIMENT

Figure 1:
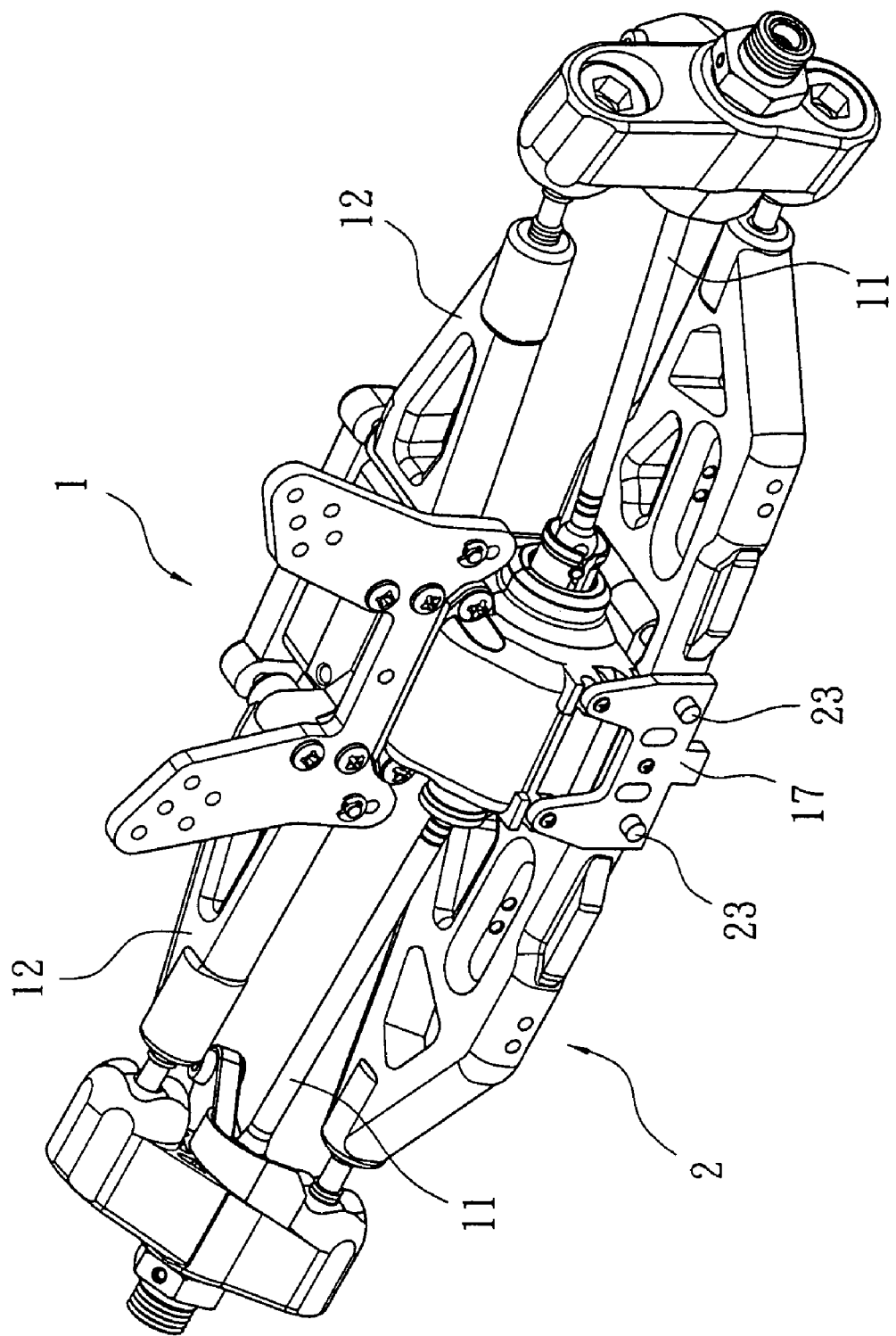
FIG. 1 is a perspective view of the invention.
Figure 2:
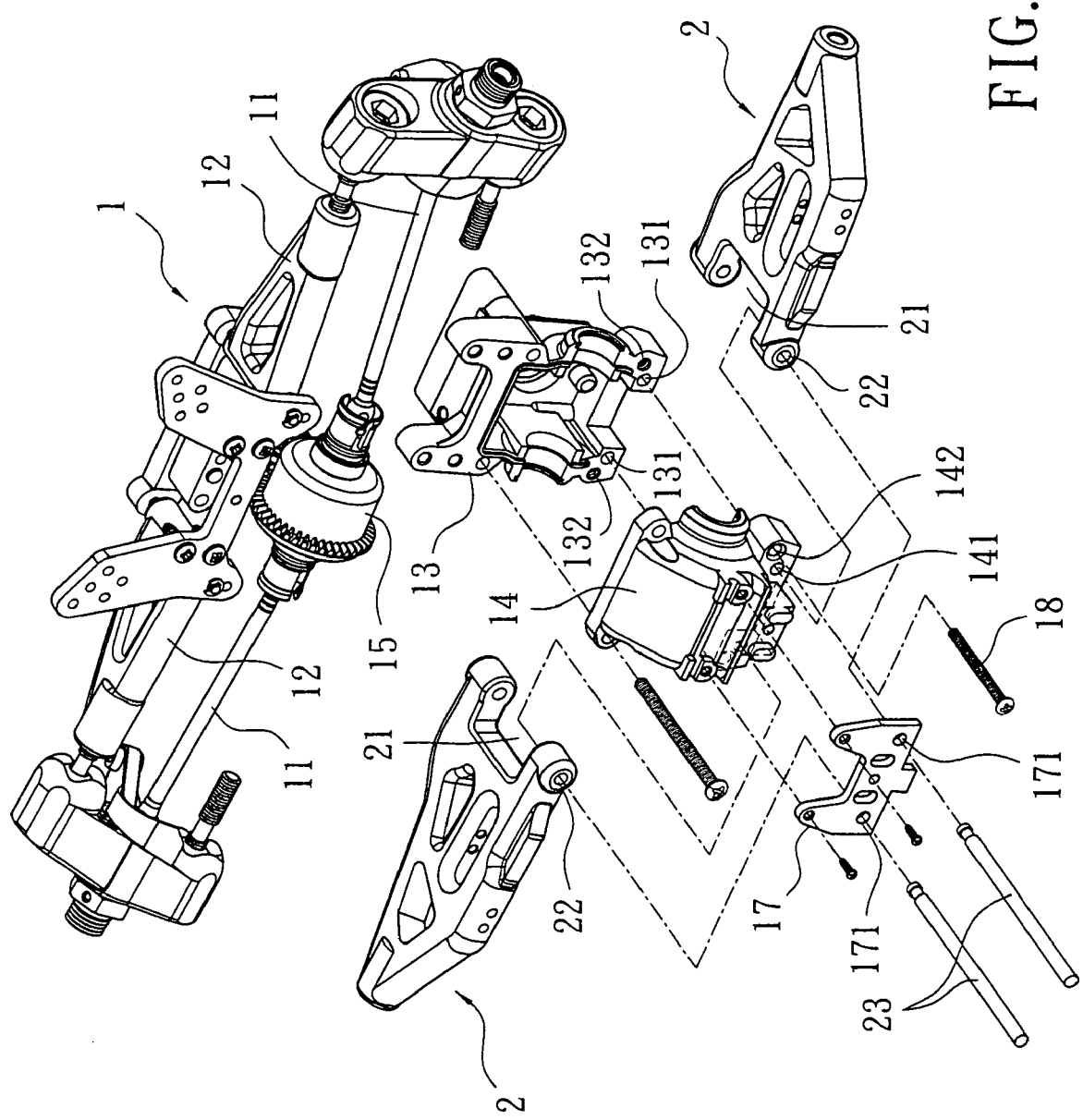
FIG. 2 is an exploded view of the invention.
Figure 3:
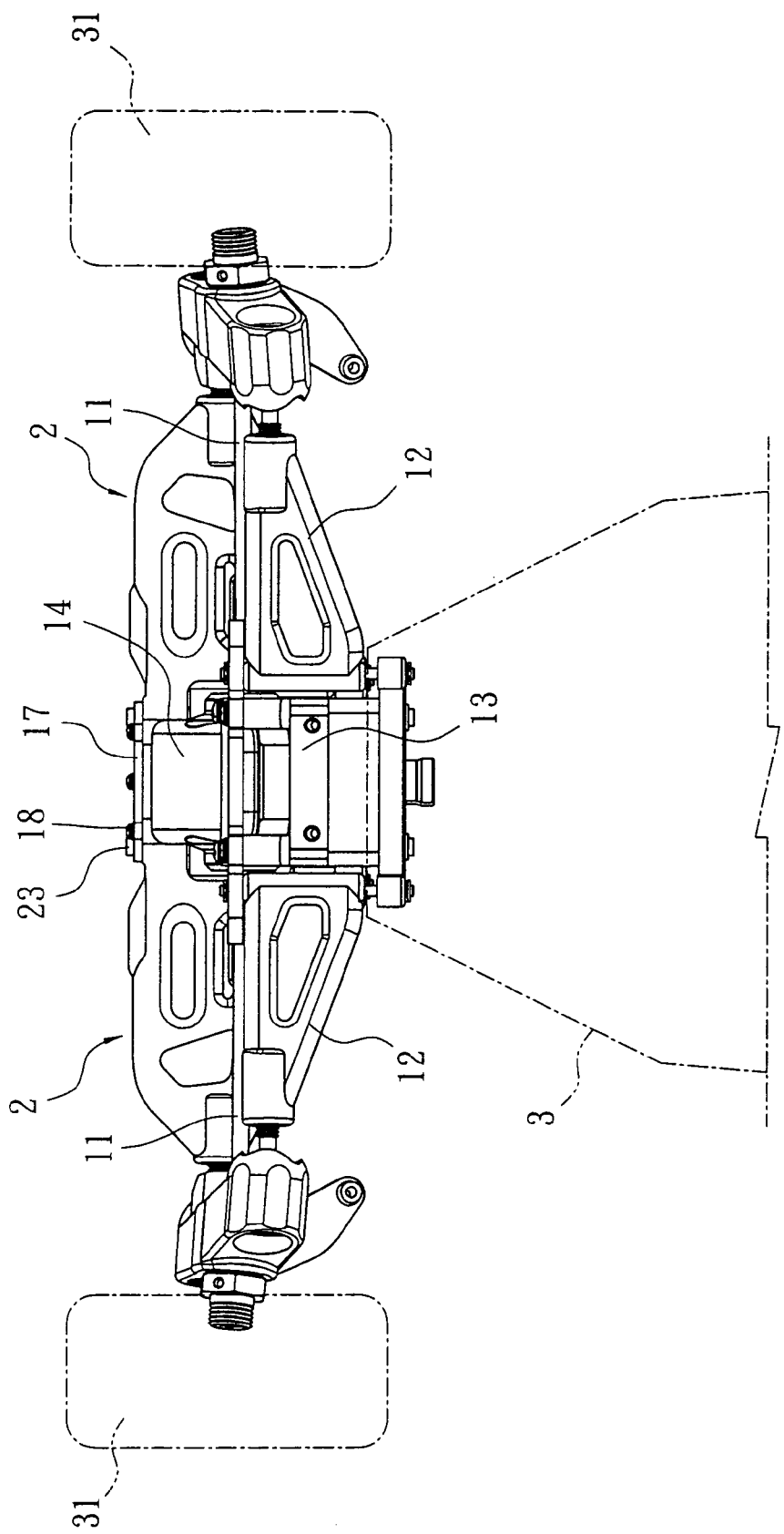
FIG. 3 shows the invention in assembled status.
Figure 4:
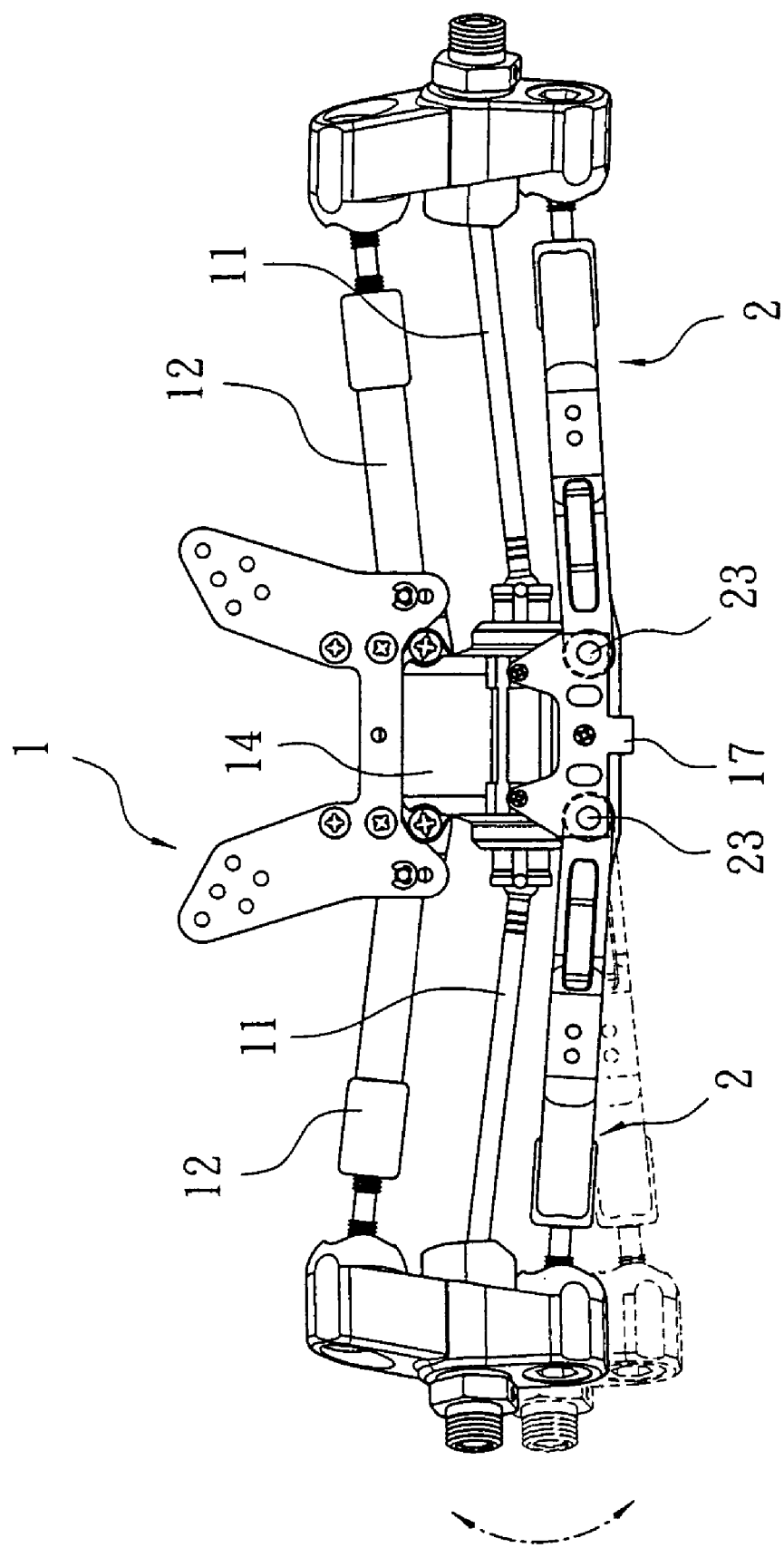
FIG. 4 shows the invention in moving status.
Figure 5:
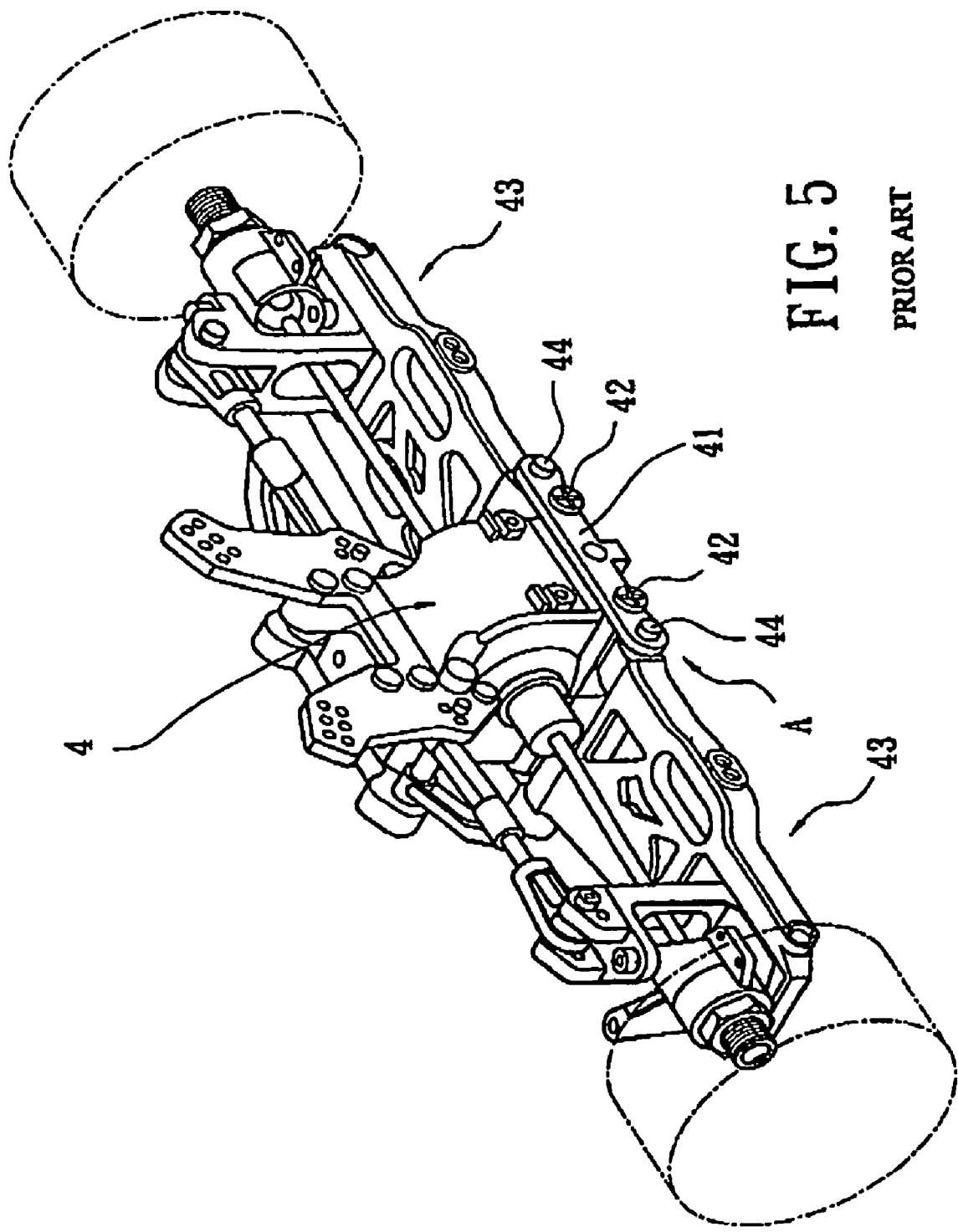
FIG. 5 is a perspective view showing a conventional supporting arm structure.
Figure 6:
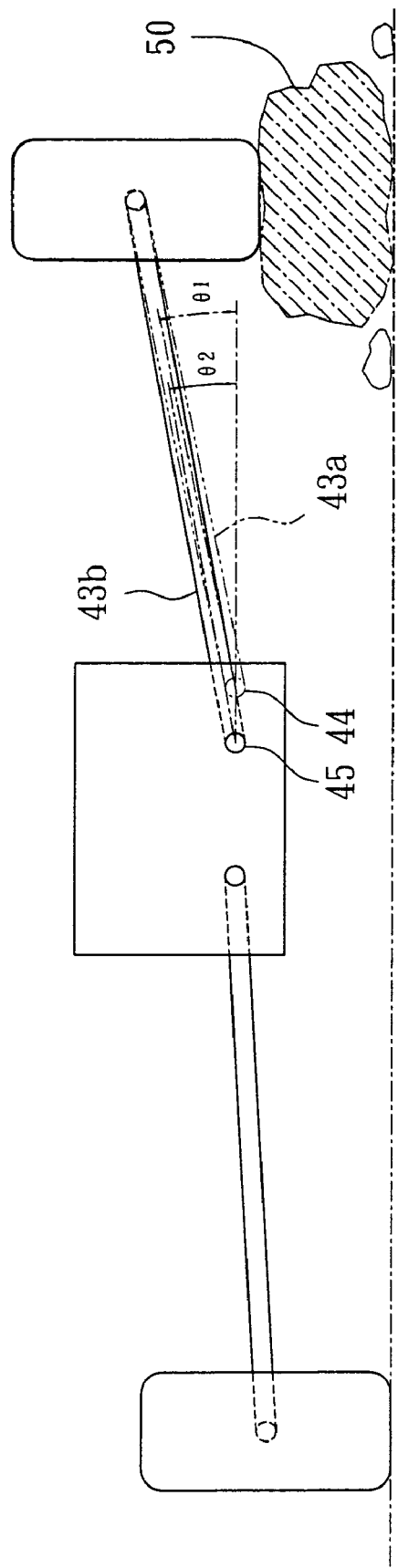
FIG. 6 shows the comparison of a conventional supporting arm structure and the invention under a circumstance when the wheel is dashed.
Figure 7A:
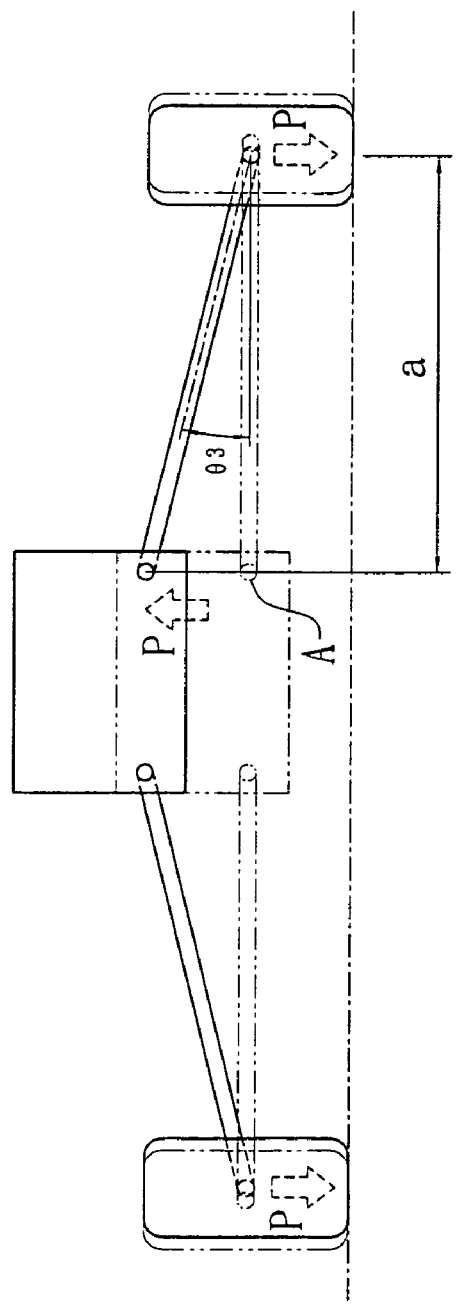
FIGS. 7a, 7b respectively show the stability of the prior art and the invention when in a driving status.
Figure 7B:
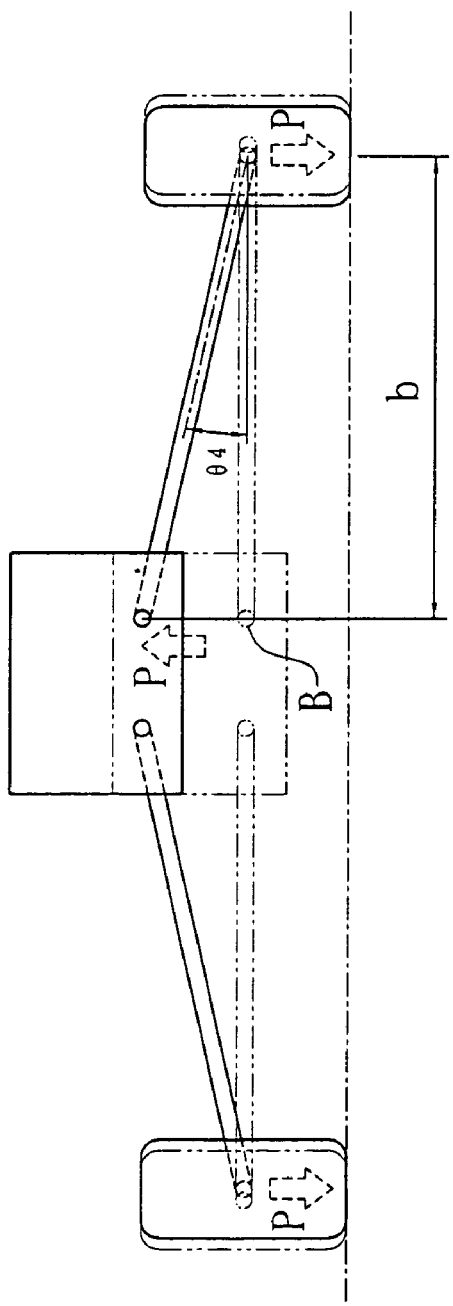

Referring to FIGS. 1 to 4, the invention relates to an improved suspending and stabilizing structure for a remote control car, which at least comprises a primary frame 1 and two supporting arms 2. The wheels 31 of the vehicle 3 are fastened to the ends of the supporting arms 2.

The primary frame 1 is moveably connected with transmission shafts 11 and arms 12, while the bottom of the primary frame 1 is provided wit a holder 13, which is provided with a holding hole 131 and a threaded hole 132 at each side. One end of the holder 13 is provided with a cover 14, on which through holes 141 and threaded holes 142 respectively corresponding to the holding holes 131 and the threaded holes 132 are provided. The holder 13 and cover 14 can be combined to mount on the front differential 15 for dust proof purpose. Besides, the front end of the cover 14 can be provided with a front board 17, which has holes 171 corresponding to the through holes 141 on the cover 14.

The supporting arms 2 are moveably connected to the two sides of the primary frame 1 on the holder 13 and the cover 14. A recession 21 is provided at one end of each supporting arm 2, while a hole 22 corresponding to the holding hole 131 is provided on each sidewall of the recessions 21. Thereby the supporting arms 2 can be mounted on the holder 13 and the cover 14 of the primary frame by way of the recessions 21. Besides, after the corresponding holes 22, the holding holes 131, the trough holes 141 and the holes 171 on the front board 17 are arranged in one line, a fastening pillar 23 can be inserted into these holes, such that the supporting arms 2 can be moveably connected to the two sides of the primary frame 1. While the holder 13 is provided with threaded holes 132 at the outer side of the holding holes 131, the cover 14 is provided with threaded holes 142 at the outer side of the through holes 141. Thereby screws 18 can be fastened to the threaded holes 142, 132 to connect with the holder and cover to the exterior of the front differential 15. Accordingly, the front differential 15 can be held on the primary frame 1. Meanwhile, the pivotal connection point of the supporting arms 2 can be efficiently moved inwardly, such that the length of the supporting arms can be designed as the greatest extent. According to the above, the improved suspending and stabilizing structure and shock absorbing structure for a remote control car can be achieved.

While the invention is for installation on the front differential at the front end of a vehicle 3 (remote control car), wheels 31 can be installed at the two sides of the transmission shafts 11 of the primary frame 1. When the user is operating the vehicle 3 (remote control car) on a rough road for amusement or competition purposes, the wheels 31 would oscillate violently due to the rough surface of the road, causing the supporting arms 2 to oscillate as well. As the invention can permit the supporting arms 2 to be lengthened, when the wheels 31 are running on rough roads, the oscillation of the supporting arm 2 can be reduced, thereby enhancing the shock absorbing effect of the vehicle 3 (remote control car).

In one embodiment of the invention, as shown in the figures, the holder 13 is provided with a cover 14 at the front end, such that the holder 13 and cover 14 can cover the front differential in left and right. In another preferred embodiment (not shown), the holder 13 and the cover 14 can cover the front differential in up and down, such tat the position of the holder 13 would be at the baseboard of the vehicle 3. Therefore, the holder 13 can be simply provided with holding holes 131 and threaded holes 132 as fastening elements to connect with the supporting arm 2.

Concluded above, the suspending and stabilizing structure for a remote control car according to the invention can efficiently improve the disadvantages in the prior art, thereby making the shock absorbing structure of the front differential of a remote control car greatly improved, more functional and more applicable to the user's need. The invention is neat in terms of components and their assemblage, which is novel to the design of a engine actuator mechanism for the present remote control cars, and the efficiency is highly improved. Accordingly, the inventor has claimed his invention.

Although specific embodiments have been illustrated and described, it will be obvious to those skilled in the art that various modifications may be made without departing from what is intended to be limited solely by the appended claims.

I claim:

1. An improved suspending and stabilizing structure for a remote control car, comprising a primary frame being provided with a holder on the bottom, which is provided with holding holes and threaded holes at two ends; and two supporting arms which are pivotally held on the holder of the primary frame by way of holding pillars; characterized in that: the holding holes on the holder of the primary frame are pivotally connected with corresponding holes on the supporting arms, such that the supporting arms can be fastened to the primary frame.

2. The improved suspending and stabilizing structure for a remote control car according to claim 1, wherein the supporting arms are moveably connected to two sides of the holder of the primary frame; one end of each supporting arm is provided wit a recession, two side walls of which are provided with a hole corresponding to the holding hole on the holder for pivotally receiving a holding pillar.

3. The improved suspending and stabilizing structure for a remote control car according to claim 1, wherein the holder and a cover may cover the exterior of a front differential for dust-proof purposes, while the holder and the cover are connected to the supporting arms, respectively.

4. An improved suspending and stabilizing structure for a remote control car, at least comprising a primary frame being provided with a holder on the bottom, which is provided with holding holes and threaded holes at two ends, and a cover being provided with through holes and threaded holes at two ends; and two supporting arms which are pivotally held on the holder of the primary frame by way of holding pillars; characterized in that: each threaded hole is provided on the outer side of a holding hole and a through hole; the threaded holes of the holder and the cover are connected with screws for fastening purposes, the holding holes on the holder of the primary frame are pivotally connected with the corresponding holes on the supporting arms, such that the supporting arms can be fastened to the primary frame.

* * * * *